US012604361B2

(12) United States Patent
Vyas et al.

(10) Patent No.: US 12,604,361 B2
(45) Date of Patent: Apr. 14, 2026

(54) TECHNIQUES FOR DISCONTINUOUS RECEPTION COLLISION RESOLUTION FOR MULTI-SIM USER EQUIPMENT

(71) Applicant: QUALCOMM Incorporated, San Diego, CA (US)

(72) Inventors: Uttam Vyas, Hyderabad (IN); Sumanth Kumar Kota, Hyderabad (IN); Rishika Tindola, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 397 days.

(21) Appl. No.: 18/005,882

(22) PCT Filed: Dec. 16, 2020

(86) PCT No.: PCT/US2020/070916
§ 371 (c)(1),
(2) Date: Jan. 18, 2023

(87) PCT Pub. No.: WO2022/055541
PCT Pub. Date: Mar. 17, 2022

(65) Prior Publication Data
US 2023/0292396 A1      Sep. 14, 2023

(30) Foreign Application Priority Data
Sep. 10, 2020    (IN) .............................. 202041039078

(51) Int. Cl.
*H04W 76/28* (2018.01)
*H04W 36/00* (2009.01)
*H04W 36/30* (2009.01)

(52) U.S. Cl.
CPC ....... *H04W 76/28* (2018.02); *H04W 36/0058* (2018.08); *H04W 36/30* (2013.01)

(58) Field of Classification Search
CPC ..... H04W 88/06; H04W 76/28; H04W 68/02; H04W 36/30; H04W 36/0058; H04W 36/0061; H04W 36/0079; H04W 8/18; H04W 8/183
See application file for complete search history.

(56) References Cited

U.S. PATENT DOCUMENTS

| | | | |
|---|---|---|---|
| 2015/0141017 A1* | 5/2015 | Krishnamoorthy ... | H04W 36/08 455/437 |
| 2017/0006549 A1* | 1/2017 | Deivasigamani | ........................... H04W 52/0245 |
| 2017/0353893 A1 | 12/2017 | Marwah et al. | |

(Continued)

FOREIGN PATENT DOCUMENTS

| | | |
|---|---|---|
| CN | 104902506 A | 9/2015 |
| WO | 2015073448 A1 | 5/2015 |

OTHER PUBLICATIONS

Garg V.K., "Wireless Communications and Networking", Jul. 26, 2007 (Jul. 26, 2007), Elsevier Science Technology, San Francisco (USA), XP002803097, 931 Pages, ISBN: 9780123735805, pp. 387-388, the whole document.

(Continued)

*Primary Examiner* — Peter Chen
(74) *Attorney, Agent, or Firm* — Harrity & Harrity, LLP

(57) ABSTRACT
In a device (120) with two SIMs (305*a*, 305*b*), the overlapping DRXs of the two connections is reduced by handovering one of the two SIM to a neighbor cell that satisfies a quality threshold.

30 Claims, 9 Drawing Sheets

(56) References Cited

U.S. PATENT DOCUMENTS

2018/0368099 A1    12/2018  Chen et al.
2023/0131188 A1*   4/2023  Hu  ..................... H04B 7/06964
                                          370/329

OTHER PUBLICATIONS

International Search Report and Written Opinion—PCT/US2020/
070916—ISA/EPO—Jun. 7, 2021.

* cited by examiner

Start

510 — Overlap between CDRX cycles of first SIM and second SIM?

No → 520 Reset collision counter

Yes

530 — Increment collision counter

540 — Collision counter satisfies collision threshold?

Yes → Proceed to block 610

No

500

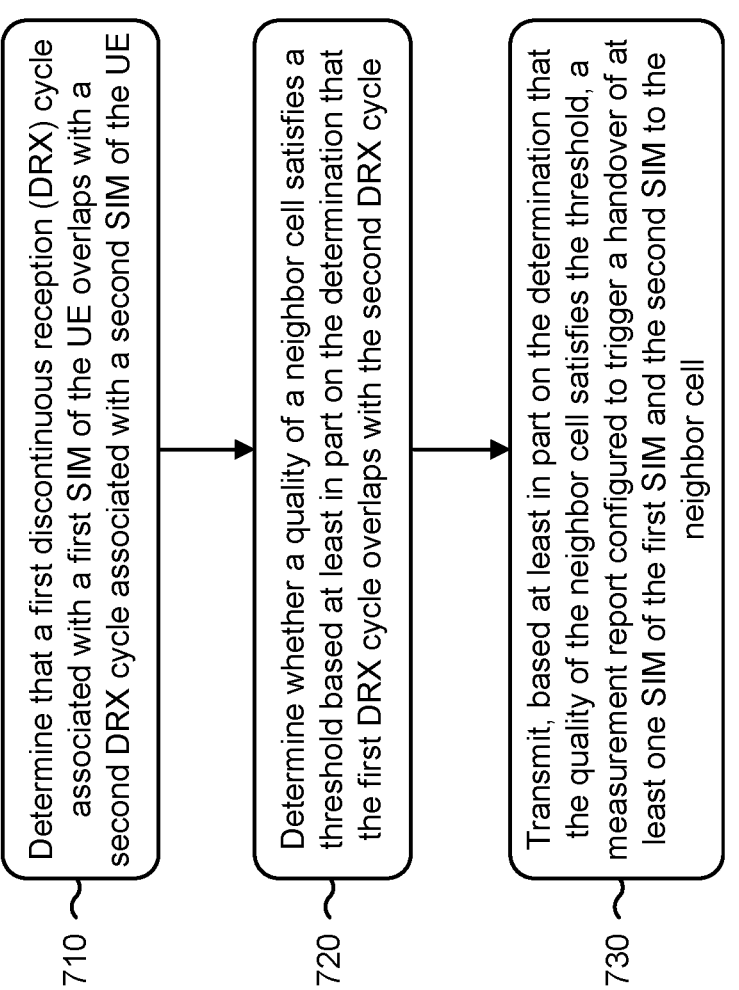

710 Determine that a first discontinuous reception (DRX) cycle associated with a first SIM of the UE overlaps with a second DRX cycle associated with a second SIM of the UE 720 Determine whether a quality of a neighbor cell satisfies a threshold based at least in part on the determination that the first DRX cycle overlaps with the second DRX cycle 730 Transmit, based at least in part on the determination that the quality of the neighbor cell satisfies the threshold, a measurement report configured to trigger a handover of at least one SIM of the first SIM and the second SIM to the neighbor cell

Reception Component 902

Handover Component
908

Transmission Component 904

906

TECHNIQUES FOR DISCONTINUOUS RECEPTION COLLISION RESOLUTION FOR MULTI-SIM USER EQUIPMENT

CROSS-REFERENCE TO RELATED APPLICATIONS

This Patent Application is a 371 national stage of PCT Application No. PCT/US2020/070916 filed on Dec. 16, 2020, entitled "TECHNIQUES FOR DISCONTINUOUS RECEPTION COLLISION RESOLUTION FOR MULTI-SIM USER EQUIPMENT," which claims priority to Indian Patent Application number 202041039078, filed on Sep. 10, 2020, entitled "TECHNIQUES FOR DISCONTINUOUS RECEPTION COLLISION RESOLUTION FOR MULTI-SIM USER EQUIPMENT," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for discontinuous reception collision resolution for a multi subscriber identity module (SIM) user equipment (UE).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining that a first discontinuous reception (DRX) cycle associated with a first subscriber identity module (SIM) of the UE overlaps with a second DRX cycle associated with a second SIM of the UE: determining whether a quality of a neighbor cell satisfies a threshold based at least in part on the determination that the first DRX cycle overlaps with the second DRX cycle; and transmitting, based at least in part on the determination that the quality of the neighbor cell satisfies the threshold, a measurement report configured to trigger a handover of at least one SIM of the first SIM and the second SIM to the neighbor cell.

In some aspects, the method includes skipping one or more active times associated with one or more of the first DRX cycle or the second DRX cycle based at least in part on the quality of the neighbor cell failing to satisfy the threshold.

In some aspects, the method includes skipping one or more active times associated with one or more of the first DRX cycle or the second DRX cycle based at least in part on the handover failing.

In some aspects, the method includes determining that the handover has failed based at least in part on determining that a handover command is not received within a threshold time period.

In some aspects, the method includes performing the handover of the at least one SIM to the neighbor cell, wherein the neighbor cell is associated with a third DRX cycle for the at least one SIM.

In some aspects, the method includes determining that the third DRX cycle overlaps with a DRX cycle of a SIM of the first SIM and the second SIM; and skipping one or more active times associated with one or more of the third DRX cycle or the DRX cycle of the SIM based at least in part on the overlap between the third DRX cycle and the DRX cycle of the SIM.

In some aspects, the method includes selecting the at least one SIM associated with the measurement report based at least in part on a pending data session or a pending signaling session associated with the at least one SIM.

In some aspects, the at least one SIM is preconfigured as associated with the measurement report.

In some aspects, a UE for wireless communication includes a memory; and one or more processors operatively coupled to the memory, the memory and the one or more processors configured to: determine that a first DRX cycle associated with a first SIM of the UE overlaps with a second DRX cycle associated with a second SIM of the UE: determine whether a quality of a neighbor cell satisfies a threshold based at least in part on the determination that the first DRX cycle overlaps with the second DRX cycle; and transmit, based at least in part on the determination that the quality of the neighbor cell satisfies the threshold, a measurement report configured to trigger a handover of at least one SIM of the first SIM and the second SIM to the neighbor cell.

In some aspects, the one or more processors are further configured to: skip one or more active times associated with one or more of the first DRX cycle or the second DRX cycle based at least in part on the quality of the neighbor cell failing to satisfy the threshold.

In some aspects, the one or more processors are further configured to: skip one or more active times associated with one or more of the first DRX cycle or the second DRX cycle based at least in part on the handover failing.

In some aspects, the one or more processors are further configured to: determine that the handover has failed based at least in part on determining that a handover command is not received within a threshold time period.

In some aspects, the one or more processors are further configured to: perform the handover of the at least one SIM to the neighbor cell, wherein the neighbor cell is associated with a third DRX cycle for the at least one SIM.

In some aspects, the one or more processors are further configured to: determine that the third DRX cycle overlaps with a DRX cycle of a SIM of the first SIM and the second SIM; and skip one or more active times associated with one or more of the third DRX cycle or the DRX cycle of the SIM based at least in part on the overlap between the third DRX cycle and the DRX cycle of the SIM.

In some aspects, the one or more processors are further configured to: select the at least one SIM associated with the measurement report based at least in part on a pending data session or a pending signaling session associated with the at least one SIM.

In some aspects, the at least one SIM is preconfigured as associated with the measurement report.

In some aspects, a non-transitory computer-readable medium storing a set of instructions for wireless communication includes one or more instructions that, when executed by one or more processors of a UE, cause the UE to: determine that a first DRX cycle associated with a first SIM of the UE overlaps with a second DRX cycle associated with a second SIM of the UE: determine whether a quality of a neighbor cell satisfies a threshold based at least in part on the determination that the first DRX cycle overlaps with the second DRX cycle; and transmit, based at least in part on the determination that the quality of the neighbor cell satisfies the threshold, a measurement report configured to trigger a handover of at least one SIM of the first SIM and the second SIM to the neighbor cell.

In some aspects, the one or more instructions further cause the UE to: skip one or more active times associated with one or more of the first DRX cycle or the second DRX cycle based at least in part on the quality of the neighbor cell failing to satisfy the threshold.

In some aspects, the one or more instructions further cause the UE to: skip one or more active times associated with one or more of the first DRX cycle or the second DRX cycle based at least in part on the handover failing.

In some aspects, the one or more instructions further cause the UE to: determine that the handover has failed based at least in part on determining that a handover command is not received within a threshold time period.

In some aspects, the one or more instructions further cause the UE to: perform the handover of the at least one SIM to the neighbor cell, wherein the neighbor cell is associated with a third DRX cycle for the at least one SIM.

In some aspects, the one or more instructions further cause the UE to: determine that the third DRX cycle overlaps with a DRX cycle of a SIM of the first SIM and the second SIM; and skip one or more active times associated with one or more of the third DRX cycle or the DRX cycle of the SIM based at least in part on the overlap between the third DRX cycle and the DRX cycle of the SIM.

In some aspects, the one or more instructions further cause the UE to: select the at least one SIM associated with the measurement report based at least in part on a pending data session or a pending signaling session associated with the at least one SIM.

In some aspects, the at least one SIM is preconfigured as associated with the measurement report.

In some aspects, an apparatus for wireless communication includes means for determining that a first DRX cycle associated with a first SIM of the UE overlaps with a second DRX cycle associated with a second SIM of the UE: means for determining whether a quality of a neighbor cell satisfies a threshold based at least in part on the determination that the first DRX cycle overlaps with the second DRX cycle; and means for transmitting, based at least in part on the determination that the quality of the neighbor cell satisfies the threshold, a measurement report configured to trigger a handover of at least one SIM of the first SIM and the second SIM to the neighbor cell.

In some aspects, the apparatus includes means for skipping one or more active times associated with one or more of the first DRX cycle or the second DRX cycle based at least in part on the quality of the neighbor cell failing to satisfy the threshold.

In some aspects, the apparatus includes means for skipping one or more active times associated with one or more of the first DRX cycle or the second DRX cycle based at least in part on the handover failing.

In some aspects, the apparatus includes means for determining that the handover has failed based at least in part on determining that a handover command is not received within a threshold time period.

In some aspects, the apparatus includes means for performing the handover of the at least one SIM to the neighbor cell, wherein the neighbor cell is associated with a third DRX cycle for the at least one SIM.

In some aspects, the apparatus includes means for determining that the third DRX cycle overlaps with a DRX cycle of a SIM of the first SIM and the second SIM; and means for skipping one or more active times associated with one or more of the third DRX cycle or the DRX cycle of the SIM based at least in part on the overlap between the third DRX cycle and the DRX cycle of the SIM.

In some aspects, the apparatus includes means for selecting the at least one SIM associated with the measurement report based at least in part on a pending data session or a pending signaling session associated with the at least one SIM.

In some aspects, the at least one SIM is preconfigured as associated with the measurement report.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process associated with discontinuous reception collision resolution for a multi-SIM UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
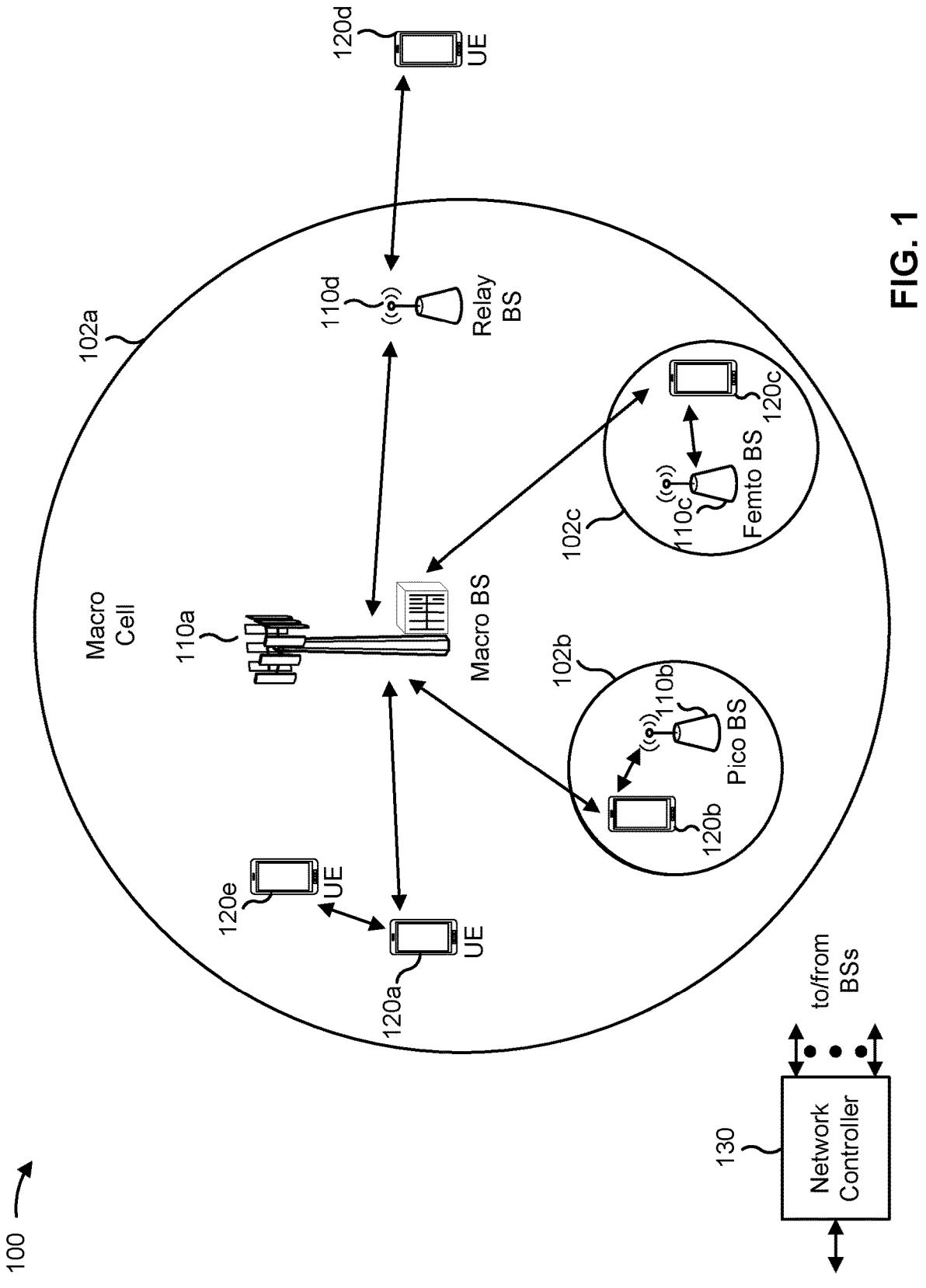
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "CNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrow band internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*c*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHZ, frequencies within FR1, and/or mid-band frequencies (e.g., greater than 7.125 GHZ). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHZ). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
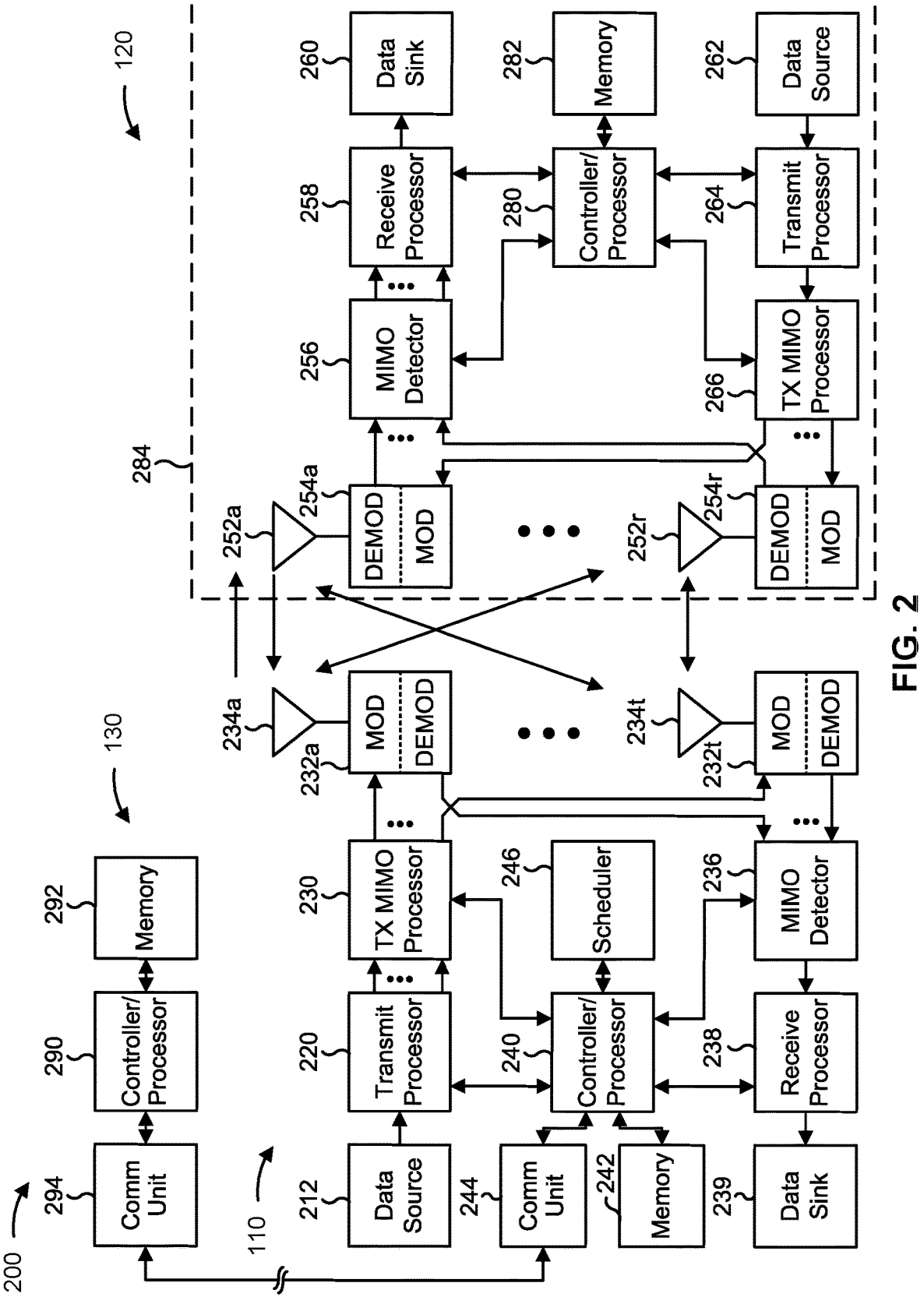
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate)

the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with discontinuous reception collision resolution for a multi subscriber identity module (multi-SIM) user equipment (UE), as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, interpreting the instructions, and/or the like.

In some aspects, the UE 120 includes means for determining that a first DRX cycle associated with a first SIM of the UE overlaps with a second DRX cycle associated with a second SIM of the UE: means for determining whether a quality of a neighbor cell satisfies a threshold based at least in part on the determination that the first DRX cycle overlaps with the second DRX cycle; and/or means for transmitting, based at least in part on the determination that the quality of the neighbor cell satisfies the threshold, a measurement report configured to trigger a handover of at least one SIM of the first SIM and the second SIM to the neighbor cell. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE includes means for skipping one or more active times associated with one or more of the first DRX cycle or the second DRX cycle based at least in part on the quality of the neighbor cell failing to satisfy the threshold.

In some aspects, the UE includes means for skipping one or more active times associated with one or more of the first DRX cycle or the second DRX cycle based at least in part on the handover failing.

In some aspects, the UE includes means for determining that the handover has failed based at least in part on determining that a handover command is not received within a threshold time period.

In some aspects, the UE includes means for performing the handover of the at least one SIM to the neighbor cell, wherein the neighbor cell is associated with a third DRX cycle for the at least one SIM.

In some aspects, the UE includes means for determining that the third DRX cycle overlaps with a DRX cycle of a SIM of the first SIM and the second SIM; and/or means for skipping one or more active times associated with one or more of the third DRX cycle or the DRX cycle of the SIM based at least in part on the overlap between the third DRX cycle and the DRX cycle of the SIM.

In some aspects, the UE includes means for selecting the at least one SIM associated with the measurement report based at least in part on a pending data session or a pending signaling session associated with the at least one SIM.

As indicated above, FIG. 2 is provided as an example. Other examples may differ from what is described with regard to FIG. 2.

Figure 3:
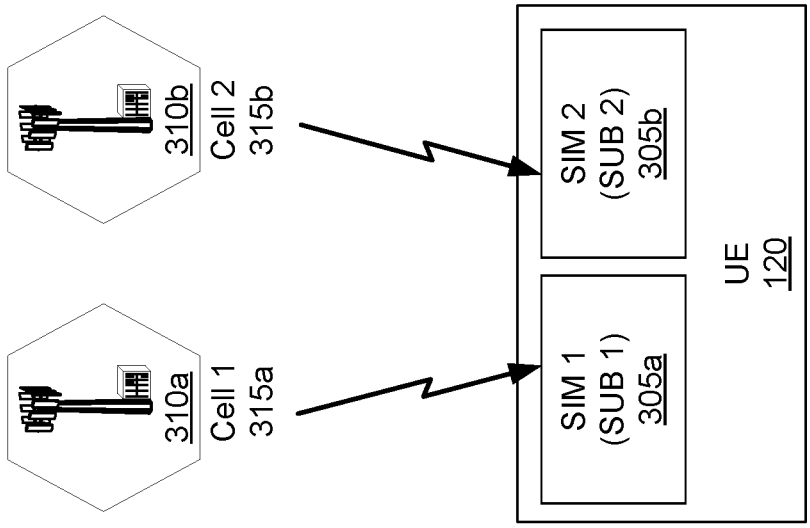
FIG. 3 is a diagram illustrating an example of a multi-subscriber identity module (multi-SIM) UE, in accordance with various aspects of the present disclosure.

FIG. 3 is a diagram illustrating an example 300 of a multiple SIM (multi-SIM) UE, in accordance with various aspects of the present disclosure. As shown in FIG. 3, a UE 120 may be a multi-SIM UE that includes multiple SIMs (two or more SIMs), shown as a first SIM 305a and a second SIM 305b. The first SIM 305a may be associated with a first subscription (shown as SUB 1), and the second SIM 305b may be associated with a second subscription (shown as SUB 2). A subscription may include a subscription with a network operator (for example, a mobile network operator (MNO)) that enables the UE 120 to access a wireless network (for example, a radio access network (RAN)) associated with the network operator.

A SIM 305 may be a removable SIM (for example, a SIM card) or an embedded SIM, among other examples. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service or a voice service, among other examples.

As further shown in FIG. 3, the UE 120 may communicate (for example, in a connected mode, an idle mode, or an inactive mode) with a first base station 310a via a first cell 315a (shown as Cell 1) using the first SIM 305a. In this case, a first subscription (SUB 1) of the UE 120 may be used to access the first cell 315a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310b via a second cell 315b (shown as Cell 2) using the second SIM 305b. In this case, a second subscription (SUB 2) of the UE 120 may be used to access the second cell 315b (for example, using a second IMSI for UE identification, using a second security key for UE authentication, using a second list of services that the UE 120 is permitted to access using the second subscription, or by counting data or voice usage on the second cell against the second subscription, among other examples).

The first base station 310a and/or the second base station 310b may include one or more of the base stations 110 described above in connection with FIG. 1. Although the first cell 315a and the second cell 315b are shown as being provided by different base stations, in some aspects, the first cell 315 and the second cell 315b may be provided by the same base station. Thus, in some aspects, the first base station 310a and the second base station 310b may be integrated into a single base station.

In some cases, the UE 120 may be a single receiver (SR) (sometimes also referred to as single radio) multi-SIM UE, such as an SR multi-SIM multiple standby (SR-MSMS) UE or a single receiver dual SIM dual standby (SR-DSDS) UE, among other examples. A multi-SIM UE may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, an SR-DSDS UE or an SR-MSMS UE may only be capable of receiving data on one connection at a time because radio frequency resources are shared between the multiple subscriptions. For example, an SR-DSDS UE or an SR-MSMS UE may be associated with multiple subscriptions but may include only a single transceiver shared by the multiple subscriptions, a single transmit chain shared by the multiple subscriptions, or a single receive chain shared by the multiple subscriptions, among other examples.

As indicated above, FIG. 3 is provided as an example. Other examples may differ from what is described with regard to FIG. 3.

Figure 4:
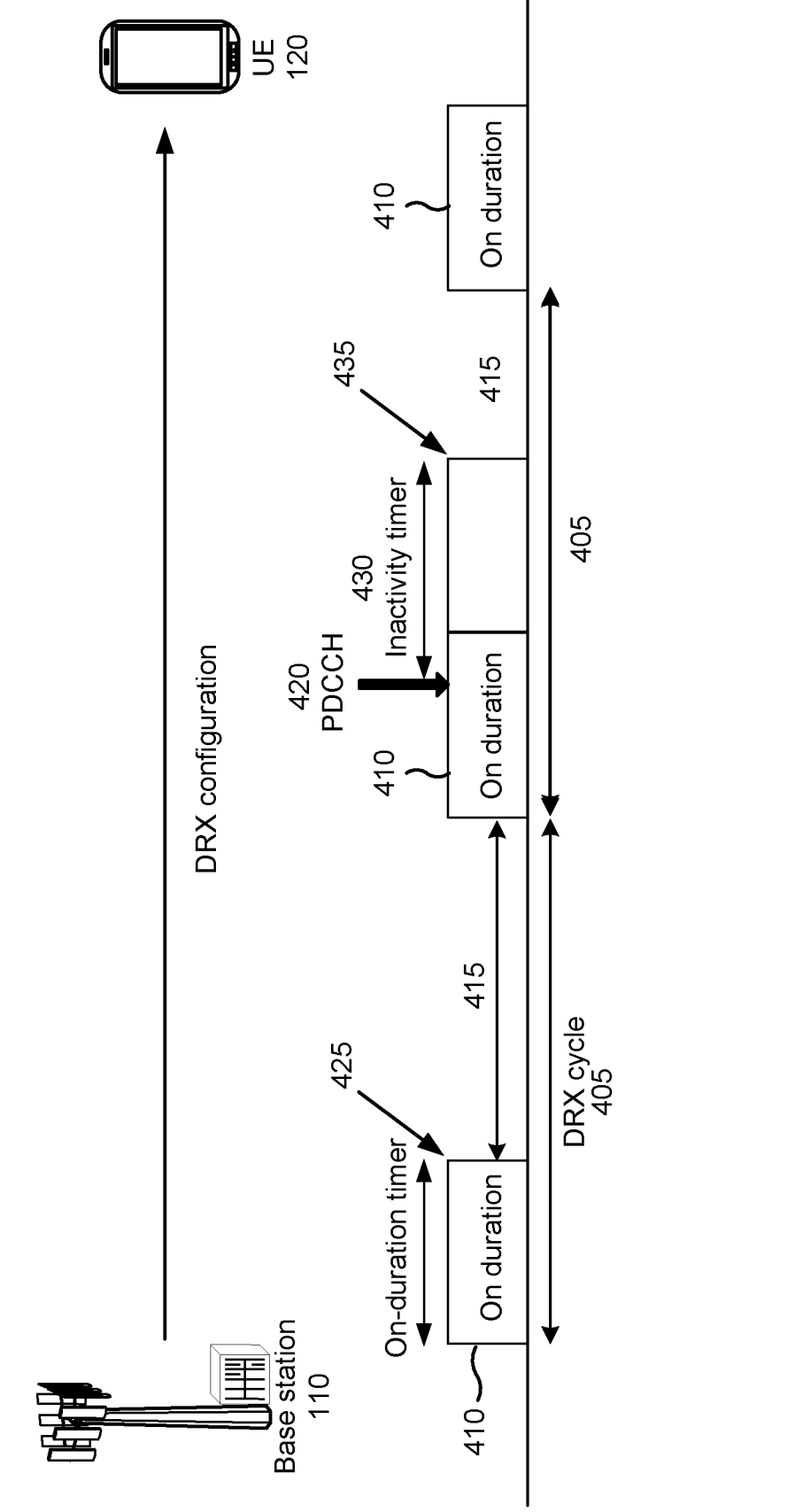
FIG. 4 is a diagram illustrating an example of a discontinuous reception (DRX) configuration, in accordance with various aspects of the present disclosure.

FIG. 4 is a diagram illustrating an example 400 of a discontinuous reception (DRX) configuration, in accordance with various aspects of the present disclosure.

As shown in FIG. 4, a base station 110 may transmit a DRX configuration to a UE 120 to configure a DRX cycle 405 for the UE 120. A DRX cycle 405 may include a DRX on duration 410 (e.g., during which a UE 120 is awake or in an active state) and an opportunity to enter a DRX sleep state 415. As used herein, the time during which the UE 120 is configured to be in an active state during the DRX on duration 410 may be referred to as an active time, and the time during which the UE 120 is configured to be in the DRX sleep state 415 may be referred to as an inactive time. As described below, the UE 120 may monitor a physical downlink control channel (PDCCH) during the active time and may refrain from monitoring the PDCCH during the inactive time.

During the DRX on duration 410 (e.g., the active time), the UE 120 may monitor a downlink control channel (e.g., a PDCCH), as shown by reference number 420. For example, the UE 120 may monitor the PDCCH for downlink control information (DCI) pertaining to the UE 120. A PDCCH communication intended for the UE 120, such as including the DCI pertaining to the UE 120, may be referred to as paging directed to the UE 120. If the UE 120 does not detect and/or successfully decode any PDCCH communications intended for the UE 120 during the DRX on duration 410, then the UE 120 may enter the sleep state 415 (e.g., for the inactive time) at the end of the DRX on duration 410, as shown by reference number 425. In this way, the UE 120 may conserve battery power and reduce power consumption. As shown, the DRX cycle 405 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 430 (e.g., which may extend the active time). The UE 120 may start the DRX inactivity timer 430 at a time at which the PDCCH communication is received (e.g., in a transmission time interval (TTI) in which the PDCCH communication is received, such as a slot, a subframe, and/or the like). The UE 120 may remain in the active state until the DRX inactivity timer 430 expires, at which time the UE 120 may enter the sleep state 415 (e.g., for the inactive time), as shown by reference number 435. During the duration of the DRX inactivity timer 430, the UE 120 may continue to monitor for PDCCH communications, may obtain a downlink data communication (e.g., on a downlink data channel, such as a physical downlink shared channel (PDSCH)) scheduled by the PDCCH communication, may prepare and/or transmit an uplink communication (e.g., on a physical uplink shared channel (PUSCH)) scheduled by the PDCCH communication, and/or the like. The UE 120 may restart the DRX inactivity timer 430 after each detection of a PDCCH communication for the UE 120 for an initial transmission (e.g., but not for a retransmission). By operating in this manner, the UE 120 may conserve battery power and reduce power consumption by entering the sleep state 415.

As indicated above. FIG. 4 is provided as an example. Other examples may differ from what is described with respect to FIG. 4.

In a multi-SIM mode such as a dual SIM dual standby (DSDS) mode, a dedicated data service (DDS) subscriber may perform data activity, call activity, and/or the like. For example, a DDS subscriber may be identified by user input, by a default configuration of the UE, may be configured for the UE, or the like. A non-DDS subscriber may perform call-related activity, small data activity (e.g., short message service (SMS) activity or multimedia message service (MMS) activity), or similar tasks. In some aspects, a DDS subscriber may be associated with a less expensive data plan (e.g., a low cost data plan) than a non-DDS subscriber. A DDS subscriber can also be referred to as a default data SIM, a default data subscription, a primary subscription, or the like. In some aspects, a DDS subscriber may be configured to transmit data (e.g., application data) and Voice over LTE (VoLTE) traffic, whereas a non-DDS subscriber may be configured only for VoLTE traffic. "Subscriber" is used interchangeably with "SIM" herein. The UE may perform activity associated with a DDS subscriber and a non-DDS subscriber via respective resource control (RRC) connections (e.g., different RRC connections for the DDS subscriber and the non-DDS subscriber).

In some cases, a network may not release an RRC connection after a data or signaling session has concluded. Delay in releasing an RRC connection after a data or signaling session has concluded may result in a corresponding subscriber (e.g., a DDS or non-DDS subscriber) staying in an RRC connected mode until the RRC connection is released. In a connected mode, the network may configure a connected mode DRX (CDRX) cycle, such as a CDRX cycle longer than 160 ms. If a DDS subscriber and a non-DDS subscriber are in an RRC connected mode, the network may configure respective CDRX cycles for the DDS subscriber and the non-DDS subscriber. The CDRX cycles may save power for the UE and may facilitate the sharing of radio frequency resources between the subscribers, assuming that the CDRX cycles are properly configured.

While maintaining an RRC connection after the conclusion of the data or signaling session may be advantageous for a single-SIM UE, the maintenance of multiple RRC connections for a multi-SIM UE may increase the risk of colliding CDRX cycles. For example, if respective CDRX cycles of the DDS subscriber and the non-DDS subscriber are aligned so that On durations of the respective CDRX cycles at least partially overlap with each other (referred to herein as a collision), radio frequency resources may have to be allocated to only one of the subscribers, thereby diminishing throughput, causing missed calls, increasing latency, degrading user experience, and causing out of sync (OOS) or radio link failure (RLF) status.

Some techniques and apparatuses described herein provide resolution of a collision between two or more DRX cycles based at least in part on triggering a handover of one or more SIMs to a neighbor cell. For example, a UE may determine that a first DRX cycle associated with a first SIM overlaps (e.g., collides with) a second DRX cycle associated with a second SIM. The UE may identify a neighbor cell and may trigger a handover of one or more of the first SIM or the second SIM to the neighbor cell. In some aspects, the UE may transmit a measurement report (e.g., a modified measurement report) to trigger the handover to the neighbor cell. If the UE determines that no suitable neighbor cell is identified, that handover has failed, or that the collision persists on the neighbor cell, then the UE may skip one or more on durations associated with one or more DRX cycles, such that the subscribers are active in alternating active times. In this way, throughput is improved, reliability of calls is improved, latency is reduced, user experience is improved, and the occurrence of OOS and RLF status is reduced.

Figure 5:
FIGS. 5-6 are diagrams illustrating examples of resolution of a connected-mode DRX cycle collision based at least in part on triggering a handover, in accordance with various aspects of the present disclosure.
Figure 6:
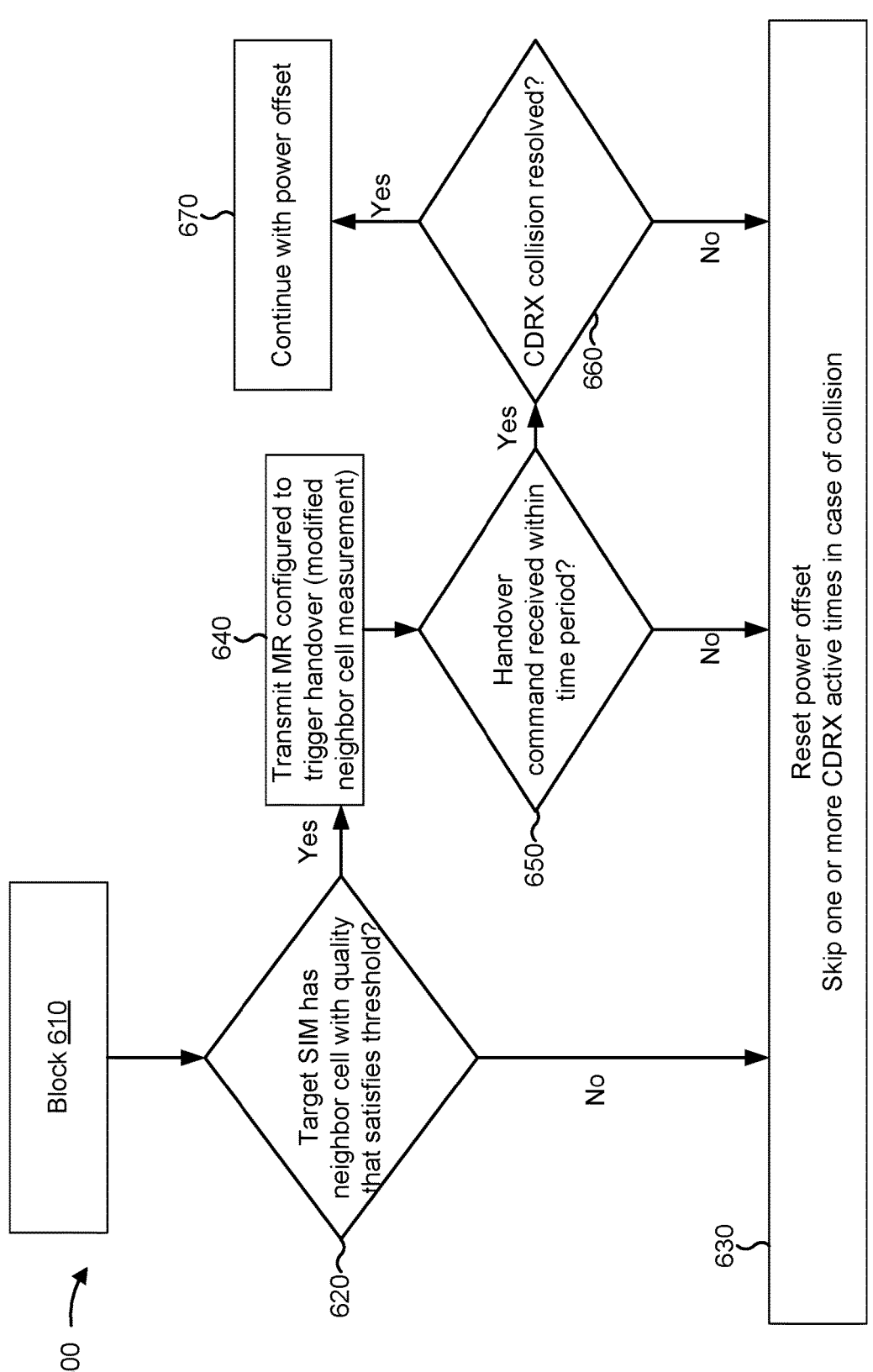

FIGS. 5 and 6 are diagrams illustrating examples 500 and 600 of resolution of a CDRX cycle collision based at least in part on triggering a handover, in accordance with various aspects of the present disclosure. The operations shown in examples 500 and 600 may be performed by a UE (e.g., UE 120). For example, the UE may be a multi-SIM UE associated with two or more SIMs (e.g., a SIM associated with a DDS subscriber and a SIM associated with a non-DDS subscriber). A first SIM may be associated with a first DRX cycle (e.g., a first CDRX cycle) and a second SIM may be associated with a second DRX cycle (e.g., a second CDRX cycle). While example 500 is described with regard to two SIMs (e.g., a first SIM and a second SIM), the operations described with regard to example 500 can be performed for any number of SIMs associated with respective CDRX cycles.

Example 500 relates to identifying an overlap, also referred to as a collision, between the first DRX cycle and the second DRX cycle. As shown in example 500, the UE may determine whether an overlap between CDRX cycles of the first SIM and the second SIM is detected (block 510). For example, the UE may determine whether an active time of the first DRX cycle at least partially overlaps an active time of the second DRX cycle. In some aspects, the UE may determine whether the active times of the first DRX cycle and the second DRX cycle overlap each other by at least a threshold (e.g., a threshold percentage of the active time). The UE may perform this determination periodically, at each active time, upon detecting a threshold throughput diminution, or based at least in part on another condition.

If the UE determines that an overlap is not detected (block 510—No), then the UE may reset a collision counter and return to block 510 (block 520). The collision counter may indicate whether the UE is to attempt to trigger handover to another cell. By resetting the collision counter if an overlap is not detected, the UE avoids triggering the handover when a collision is not persistent, thereby conserving resources that would otherwise be used to trigger and facilitate the handover.

If the UE determines than overlap is detected (block 510—Yes), then the UE may increment the collision counter (block 530). As further shown, the UE may determine whether the collision counter satisfies a collision threshold (block 540). For example, the UE may perform the determination of block 540 periodically, based at least in part on incrementing the collision counter, and/or the like. In some aspects, the collision threshold may be preconfigured for the UE (e.g., based at least in part on a wireless communication specification). If the collision counter fails to satisfy the collision threshold (block 540—No), then the UE may return to block 510. If the collision counter satisfies the collision threshold (block 540—Yes), then the UE may take action to mitigate the overlap between the first DRX cycle and the DRX cycle, which is described starting at block 610 of FIG. 6. The collision threshold can be preconfigured for the UE, determined by the UE, or configured for the UE, among other examples.

Turning to FIG. 6, the UE may determine whether a target SIM is associated with a suitable neighbor cell with a quality that satisfies a threshold (block 620). For example, the quality may be a reference signal received power, a reference signal received quality, a signal to interference plus noise ratio, and/or the like. In some aspects, the threshold may be preconfigured for the UE (e.g., based at least in part on a wireless communication specification). The target SIM may be at least one of the first SIM or the second SIM. In some aspects, the UE may select the target SIM. For example, the UE may select the target SIM based at least in part on a data or signaling session of the first SIM and/or the second SIM. In some aspects, the UE may select a SIM that is not associated with a performance-critical data or signaling session, that is not associated with a data or signaling session, and/or the like. In some aspects, the target SIM (e.g., whether the target SIM is the first SIM or the second SIM) may be preconfigured. For example, the target SIM may be preconfigured as the non-DDS SIM or the DDS SIM.

If the target SIM is not associated with a suitable neighbor cell with a quality that satisfies the threshold (block 620—No), then the UE may skip one or more DRX active times. For example, the UE may perform a skip CDRX technique. A skip CDRX technique is a technique by which the UE skips one or more DRX active times. In some aspects, the first SIM and the second SIM may be active in alternating active times based at least in part on skipping the one or more DRX active times. For example, the skip CDRX technique may include skipping alternating active times of the first SIM and the second SIM so that only one of the first SIM and the second SIM is using radio frequency resources of the UE at a given time.

If the target SIM is associated with a suitable neighbor cell with a quality that satisfies the threshold (block 620—Yes), then the UE may transmit a measurement report (MR) configured to trigger a handover to the neighbor cell (block 640). For example, the MR may indicate a modified neighbor cell measurement associated with the neighbor cell. In some aspects, the UE may apply a power offset to a neighbor cell measurement to determine the modified neighbor cell measurement, in some aspects, the power offset may be a preconfigured value.

As shown, the UE may determine whether a handover command has been received within a time period (block 650). For example, the UE may determine whether the handover has failed based at least in part on whether the handover command has been received. If the handover command has not been received (block 650—No), then the UE may proceed to block 630. In some aspects, the UE may reset (e.g., deactivate) the power offset applied to the neighbor cell measurement for the MR.

If the handover command is received within the time period (block 650—Yes), then the UE may determine whether the collision associated with the CDRX cycle is resolved (block 660). For example, the UE may determine whether a CDRX cycle of the target SIM (as configured on the neighbor cell) and a CDRX cycle of the non-target SIM overlap or collide. If the collision is resolved (block 660—Yes), for example if the CDRX cycle of the target SIM and the CDRX cycle of the non-target SIM do not overlap (or overlap by less than a threshold), then the UE may continue to operate on the neighbor cell using the power offset for the neighbor cell measurement (block 670). If the collision is not resolved (block 660—No), for example if the CDRX cycle of the target SIM and the CDRX cycle of the non-target SIM overlap (or overlap by at least a threshold), then the UE may proceed to block 630.

In this way, throughput is improved, reliability of calls is improved, latency is reduced, user experience is improved, and the occurrence of OOS and RLF status is reduced.

As indicated above, FIGS. 5 and 6 are provided as one or more examples. Other examples may differ from what is described with regard to FIGS. 5 and 6.

FIG. 7 is a diagram illustrating an example process 700 performed, for example, by a UE, in accordance with various aspects of the present disclosure. Example process 700 is an example where the UE (e.g., UE 120) performs operations associated with techniques for discontinuous reception collision resolution for multi-sim user equipment.

As shown in FIG. 7, in some aspects, process 700 may include determining that a first DRX cycle associated with a first SIM of the UE overlaps with a second DRX cycle associated with a second SIM of the UE (block 710). For example, the UE (e.g., using determination component 808, depicted in FIG. 8) may determine that a first DRX cycle associated with a first SIM of the UE overlaps with a second DRX cycle associated with a second SIM of the UE, as described above.

As further shown in FIG. 7, in some aspects, process 700 may include determining whether a quality of a neighbor cell satisfies a threshold based at least in part on the determination that the first DRX cycle overlaps with the second DRX cycle (block 720). For example, the UE (e.g., using determination component 808, depicted in FIG. 8) may determine whether a quality of a neighbor cell satisfies a threshold based at least in part on the determination that the first DRX cycle overlaps with the second DRX cycle, as described above.

As further shown in FIG. 7, in some aspects, process 700 may include transmitting, based at least in part on the determination that the quality of the neighbor cell satisfies the threshold, a measurement report configured to trigger a handover of at least one SIM of the first SIM and the second SIM to the neighbor cell (block 730). For example, the UE (e.g., using transmission component 804, depicted in FIG. 8) may transmit, based at least in part on the determination that the quality of the neighbor cell satisfies the threshold, a measurement report configured to trigger a handover of at least one SIM of the first SIM and the second SIM to the neighbor cell, as described above.

Process 700 may include additional aspects, such as any single aspect or any combination of aspects described below and/or in connection with one or more other processes described elsewhere herein.

In a first aspect, process 700 includes skipping one or more active times associated with one or more of the first DRX cycle or the second DRX cycle based at least in part on the quality of the neighbor cell failing to satisfy the threshold.

In a second aspect, alone or in combination with the first aspect, process 700 includes skipping one or more active times associated with one or more of the first DRX cycle or the second DRX cycle based at least in part on the handover failing.

In a third aspect, alone or in combination with one or more of the first and second aspects, process 700 includes determining that the handover has failed based at least in part on determining that a handover command is not received within a threshold time period.

In a fourth aspect, alone or in combination with one or more of the first through third aspects, process 700 includes performing the handover of the at least one SIM to the neighbor cell, wherein the neighbor cell is associated with a third DRX cycle for the at least one SIM.

In a fifth aspect, alone or in combination with one or more of the first through fourth aspects, process 700 includes determining that the third DRX cycle overlaps with a DRX cycle of a SIM of the first SIM and the second SIM, and skipping one or more active times associated with one or more of the third DRX cycle or the DRX cycle of the SIM based at least in part on the overlap between the third DRX cycle and the DRX cycle of the SIM.

In a sixth aspect, alone or in combination with one or more of the first through fifth aspects, process 700 includes selecting (e.g., using the selection component 810 of FIG. 8) the at least one SIM associated with the measurement report based at least in part on a pending data session or a pending signaling session associated with the at least one SIM.

In a seventh aspect, alone or in combination with one or more of the first through sixth aspects, the at least one SIM is preconfigured as associated with the measurement report.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
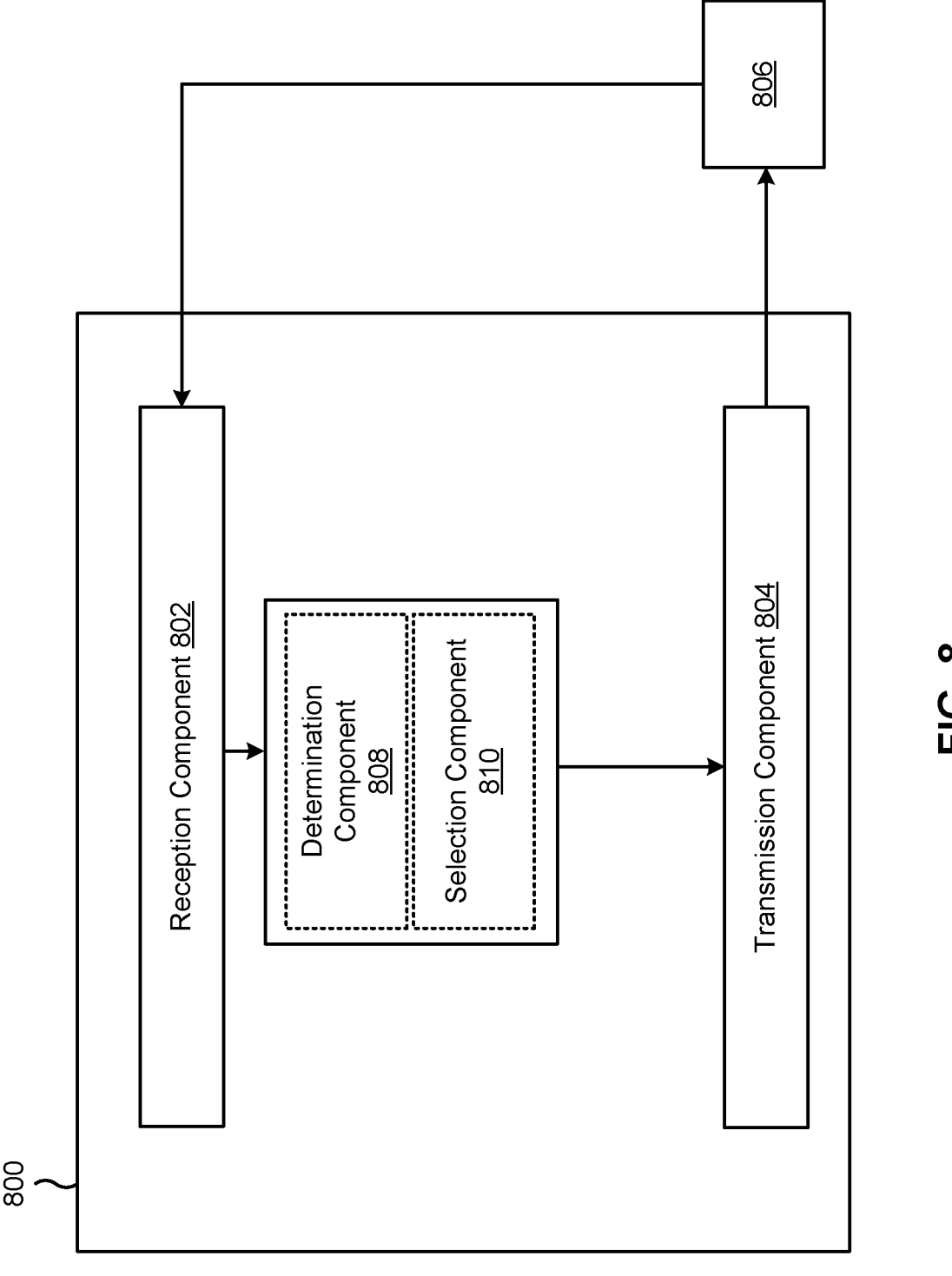
FIGS. 8-9 are block diagrams of example apparatuses for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a determination component 808 and a selection component 810, among other examples.

In some aspects, the apparatus 800 may be configured to perform one or more operations described herein in connection with FIGS. 3-6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be collocated with the reception component 802 in a transceiver.

The determination component 808 may determine that a first DRX cycle associated with a first SIM of the UE overlaps with a second DRX cycle associated with a second SIM of the UE. In some aspects, the determination component 808 may include one or more antennas, a demodulator, a MIMO detector, a receive processor, a modulator, a transmit MIMO processor, a transmit processor, a controller/processor, a memory, or a combination thereof, of the UE described above in connection with FIG. 2. In some aspects, the determination component 808 may determine whether a quality of a neighbor cell satisfies a threshold based at least in part on the determination that the first DRX cycle overlaps with the second DRX cycle, controller/processor, a memory, or a combination thereof, of the UE described above in connection with FIG. 2. The transmission component 804 may transmit, based at least in part on the determination that the quality of the neighbor cell satisfies the threshold, a measurement report configured to trigger a handover of at least one SIM of the first SIM and the second SIM to the neighbor cell. In some aspects, the determination component 808 may determine that the handover has failed based at least in part on determining that a handover command is not received within a threshold time period. In some aspects, the determination component 808 may determine that the a DRX cycle overlaps with a DRX cycle of a SIM of the first SIM and the second SIM.

The selection component 810 may select the at least one SIM associated with the measurement report based at least in part on a pending data session or a pending signaling session associated with the at least one SIM. In some aspects, the selection component 810 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
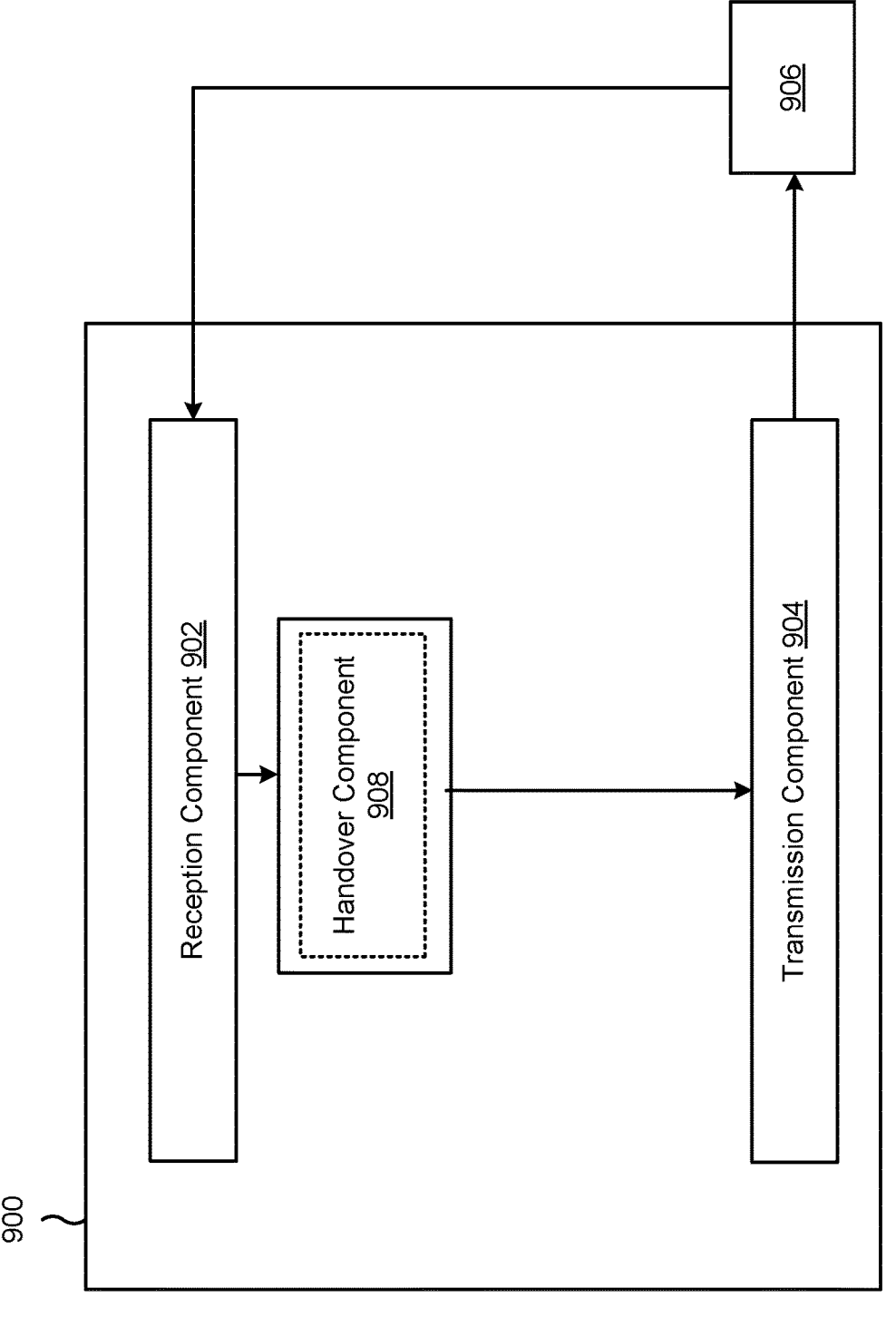

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a handover component 908, among other examples.

In some aspects, the apparatus 900 may be configured to perform one or more operations described herein in connection with FIGS. 3-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be collocated with the reception component 902 in a transceiver.

The reception component 902 may receive a measurement report from an apparatus 906. The measurement report may be configured to trigger a handover of a target SIM of the apparatus 906. The handover component 908 may perform the handover.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of aspects of the present disclosure:

Aspect 1: A method of wireless communication performed by a user equipment (UE), comprising: determining that a first discontinuous reception (DRX) cycle associated with a first subscriber identity module (SIM) of the UE overlaps with a second DRX cycle associated with a second SIM of the UE: determining whether a quality of a neighbor cell satisfies a threshold based at least in part on the determination that the first DRX cycle overlaps with the second DRX cycle; and transmitting, based at least in part on the determination that the quality of the neighbor cell satisfies the threshold, a measurement report configured to trigger a handover of at least one SIM of the first SIM or the second SIM to the neighbor cell.

Aspect 2: The method of aspect 1, further comprising: skipping one or more active times associated with one or more of the first DRX cycle or the second DRX cycle based at least in part on the quality of the neighbor cell failing to satisfy the threshold.

Aspect 3: The method of aspect 1, further comprising: skipping one or more active times associated with one or more of the first DRX cycle or the second DRX cycle based at least in part on the handover failing.

Aspect 4: The method of aspect 3, further comprising: determining that the handover has failed based at least in part on determining that a handover command is not received within a threshold time period.

Aspect 5: The method of aspect 1, further comprising: performing the handover of the at least one SIM to the neighbor cell, wherein the neighbor cell is associated with a third DRX cycle for the at least one SIM.

Aspect 6: The method of aspect 5, further comprising: determining that the third DRX cycle overlaps with a DRX cycle of a SIM of the first SIM and the second SIM; and skipping one or more active times associated with one or more of the third DRX cycle or the DRX cycle of the SIM based at least in part on the overlap between the third DRX cycle and the DRX cycle of the SIM.

Aspect 7: The method of any of aspects 1-6, further comprising: selecting the at least one SIM associated with the measurement report based at least in part on a pending data session or a pending signaling session associated with the at least one SIM.

Aspect 8: The method of any of aspects 1-7, wherein the at least one SIM is preconfigured as associated with the measurement report.

Aspect 9: An apparatus for wireless communication at a device, comprising a processor: memory coupled with the processor; and instructions stored in the memory and executable by the processor to cause the apparatus to perform the method of one or more aspects of aspects 1-8.

Aspect 10: A device for wireless communication, comprising a memory and one or more processors coupled to the memory, the memory and the one or more processors configured to perform the method of one or more aspects of aspects 1-8.

Aspect 11: An apparatus for wireless communication, comprising at least one means for performing the method of one or more aspects of aspects 1-8.

Aspect 12: A non-transitory computer-readable medium storing code for wireless communication, the code comprising instructions executable by a processor to perform the method of one or more aspects of aspects 1-8.

Aspect 13: A non-transitory computer-readable medium storing a set of instructions for wireless communication, the set of instructions comprising one or more instructions that, when executed by one or more processors of a device, cause the device to perform the method of one or more aspects of aspects 1-8.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

determining that a first discontinuous reception (DRX) cycle associated with a first subscriber identity module (SIM) of the UE overlaps with a second DRX cycle associated with a second SIM of the UE;

determining that a collision counter, associated with the first DRX cycle and the second DRX cycle, is satisfied;

determining whether a quality of a neighbor cell satisfies a threshold based at least in part on the determination that the first DRX cycle overlaps with the second DRX cycle; and transmitting, based at least in part on the determination that the quality of the neighbor cell satisfies the threshold and the determination that the collision counter is satisfied, a measurement report configured to trigger a handover of at least one SIM of the first SIM or the second SIM to the neighbor cell.

2. The method of claim 1, further comprising:

skipping one or more active times associated with one or more of the first DRX cycle or the second DRX cycle based at least in part on the quality of the neighbor cell failing to satisfy the threshold.

3. The method of claim 1, further comprising:

skipping one or more active times associated with one or more of the first DRX cycle or the second DRX cycle based at least in part on the handover failing.

4. The method of claim 3, further comprising:

determining that the handover has failed based at least in part on determining that a handover command is not received within a threshold time period.

5. The method of claim 1, further comprising:

performing the handover of the at least one SIM to the neighbor cell, wherein the neighbor cell is associated with a third DRX cycle for the at least one SIM.

6. The method of claim 5, further comprising:

determining that the third DRX cycle overlaps with a DRX cycle of a SIM of the first SIM and the second SIM; and skipping one or more active times associated with one or more of the third DRX cycle or the DRX cycle of the SIM based at least in part on the overlap between the third DRX cycle and the DRX cycle of the SIM.

7. The method of claim 1, further comprising:

selecting the at least one SIM associated with the measurement report based at least in part on a pending data session or a pending signaling session associated with the at least one SIM.

8. The method of claim 1, wherein the at least one SIM is preconfigured as associated with the measurement report.

9. A user equipment (UE) for wireless communication, comprising:

one or more memories; and one or more processors operatively coupled to the one or more memories, the one or more memories and the one or more processors configured to:

determine that a first discontinuous reception (DRX) cycle associated with a first subscriber identity module (SIM) of the UE overlaps with a second DRX cycle associated with a second SIM of the UE;

determine whether a quality of a neighbor cell satisfies a threshold based at least in part on the determination that the first DRX cycle overlaps with the second DRX cycle; and transmit, based at least in part on the determination that the quality of the neighbor cell satisfies the threshold and a determination that a collision counter, associated with the first DRX cycle and the second DRX cycle, is satisfied, a measurement report configured to trigger a handover of at least one SIM of the first SIM or the second SIM to the neighbor cell.

10. The UE of claim 9, wherein the one or more processors are further configured to:

skip one or more active times associated with one or more of the first DRX cycle or the second DRX cycle based at least in part on the quality of the neighbor cell failing to satisfy the threshold.

11. The UE of claim 9, wherein the one or more processors are further configured to:

skip one or more active times associated with one or more of the first DRX cycle or the second DRX cycle based at least in part on the handover failing.

12. The UE of claim 11, wherein the one or more processors are further configured to:

determine that the handover has failed based at least in part on determining that a handover command is not received within a threshold time period.

13. The UE of claim 9, wherein the one or more processors are further configured to:

perform the handover of the at least one SIM to the neighbor cell, wherein the neighbor cell is associated with a third DRX cycle for the at least one SIM.

14. The UE of claim 13, wherein the one or more processors are further configured to:

determine that the third DRX cycle overlaps with a DRX cycle of a SIM of the first SIM and the second SIM; and skip one or more active times associated with one or more of the third DRX cycle or the DRX cycle of the SIM based at least in part on the overlap between the third DRX cycle and the DRX cycle of the SIM.

15. The UE of claim 9, wherein the one or more processors are further configured to:

select the at least one SIM associated with the measurement report based at least in part on a pending data session or a pending signaling session associated with the at least one SIM.

16. The UE of claim 9, wherein the at least one SIM is preconfigured as associated with the measurement report.

17. A non-transitory computer-readable medium storing a set of instructions for wireless communication, the set of instructions comprising:

one or more instructions that, when executed by one or more processors of a user equipment (UE), cause the UE to:

determine that a first discontinuous reception (DRX) cycle associated with a first subscriber identity module (SIM) of the UE overlaps with a second DRX cycle associated with a second SIM of the UE;

determine whether a quality of a neighbor cell satisfies a threshold based at least in part on the determination that the first DRX cycle overlaps with the second DRX cycle; and transmit, based at least in part on the determination that the quality of the neighbor cell satisfies the threshold and a determination that a collision counter, associated with the first DRX cycle and the second DRX cycle, is satisfied, a measurement report configured to trigger a handover of at least one SIM of the first SIM or the second SIM to the neighbor cell.

18. The non-transitory computer-readable medium of claim 17, wherein the one or more instructions further cause the UE to:

skip one or more active times associated with one or more of the first DRX cycle or the second DRX cycle based at least in part on the quality of the neighbor cell failing to satisfy the threshold.

19. The non-transitory computer-readable medium of claim 17, wherein the one or more instructions further cause the UE to:

skip one or more active times associated with one or more of the first DRX cycle or the second DRX cycle based at least in part on the handover failing.

20. The non-transitory computer-readable medium of claim 19, wherein the one or more instructions further cause the UE to:

determine that the handover has failed based at least in part on determining that a handover command is not received within a threshold time period.

21. The non-transitory computer-readable medium of claim 17, wherein the one or more instructions further cause the UE to:

perform the handover of the at least one SIM to the neighbor cell, wherein the neighbor cell is associated with a third DRX cycle for the at least one SIM.

22. The non-transitory computer-readable medium of claim 21, wherein the one or more instructions further cause the UE to:

determine that the third DRX cycle overlaps with a DRX cycle of a SIM of the first SIM and the second SIM; and skip one or more active times associated with one or more of the third DRX cycle or the DRX cycle of the SIM based at least in part on the overlap between the third DRX cycle and the DRX cycle of the SIM.

23. The non-transitory computer-readable medium of claim 17, wherein the one or more instructions further cause the UE to:

select the at least one SIM associated with the measurement report based at least in part on a pending data session or a pending signaling session associated with the at least one SIM.

24. The non-transitory computer-readable medium of claim 17, wherein the at least one SIM is preconfigured as associated with the measurement report.

25. An apparatus for wireless communication, comprising:

means for determining that a first discontinuous reception (DRX) cycle associated with a first subscriber identity module (SIM) of the apparatus overlaps with a second DRX cycle associated with a second SIM of the apparatus;

means for determining whether a quality of a neighbor cell satisfies a threshold based at least in part on the determination that the first DRX cycle overlaps with the second DRX cycle; and means for transmitting, based at least in part on the determination that the quality of the neighbor cell satisfies the threshold and a determination that a collision counter, associated with the first DRX cycle and the second DRX cycle, is satisfied, a measurement report configured to trigger a handover of at least one SIM of the first SIM or the second SIM to the neighbor cell.

26. The apparatus of claim 25, further comprising:

means for skipping one or more active times associated with one or more of the first DRX cycle or the second DRX cycle based at least in part on the quality of the neighbor cell failing to satisfy the threshold.

27. The apparatus of claim 25, further comprising:

means for skipping one or more active times associated with one or more of the first DRX cycle or the second DRX cycle based at least in part on the handover failing.

28. The apparatus of claim 27, further comprising:

means for determining that the handover has failed based at least in part on determining that a handover command is not received within a threshold time period.

29. The apparatus of claim 25, further comprising:

means for performing the handover of the at least one SIM to the neighbor cell, wherein the neighbor cell is associated with a third DRX cycle for the at least one SIM.

30. The apparatus of claim 29, further comprising:

means for determining that the third DRX cycle overlaps with a DRX cycle of a SIM of the first SIM and the second SIM; and means for skipping one or more active times associated with one or more of the third DRX cycle or the DRX cycle of the SIM based at least in part on the overlap the third DRX cycle and the DRX cycle of the SIM.

* * * * *